United States Patent [19]

Ballard et al.

[11] Patent Number: 5,196,489

[45] Date of Patent: * Mar. 23, 1993

[54] PROCESS FOR EXTRUSION POLYMERIZATION OF ACRYLIC MONOMERS

[75] Inventors: Dennis G. H. Ballard, Chester; Anthony Pickering, Cheshire; Peter J. I. Runciman, Durham, all of England

[73] Assignee: Imperial Chemical Industries, Plc, London, England

[*] Notice: The portion of the term of this patent subsequent to Jan. 7, 2009 has been disclaimed.

[21] Appl. No.: 719,294

[22] Filed: Jun. 25, 1991

[30] Foreign Application Priority Data

Jun. 25, 1990 [GB] United Kingdom ............... 9014080

[51] Int. Cl.$^5$ .......................... C08F 2/02; C08F 4/16
[52] U.S. Cl. ...................... 526/64; 526/194; 526/192; 526/71; 526/73
[58] Field of Search ............... 526/194, 192, 64, 73, 526/71

[56] References Cited

U.S. PATENT DOCUMENTS

| | | | |
|---|---|---|---|
| 3,234,303 | 2/1966 | Bild et a. | 526/64 X |
| 5,019,364 | 5/1991 | Boettcher et al. | 526/262 |
| 5,079,206 | 1/1992 | Ballard et al. | 502/153 |

FOREIGN PATENT DOCUMENTS

| | | |
|---|---|---|
| 0323082 | 7/1989 | European Pat. Off. . |
| 0405785 | 1/1991 | European Pat. Off. . |
| 0405786 | 1/1991 | European Pat. Off. . |
| 58-053974 | 3/1983 | Japan . |

OTHER PUBLICATIONS

O. W. Webster et al., (1983) J. Am. Chem. Soc. 105, 5706–5708.
D. Y. Sogah et al., (1987) Macro Mol. 20, 1473–1488.

*Primary Examiner*—Joseph L. Schofer
*Assistant Examiner*—Mark Nagumo
*Attorney, Agent, or Firm*—Cushman, Darby & Cushman

[57] ABSTRACT

An extrusion polymerization process is described in which the polymerization of vinylic monomers, in particular acrylic monomers, is carried out in bulk in an extruder. The polymerization reaction is catalysed by a catalyst composition comprising an initiator, e.g. a ureido substituted silane, and a co-catalyst which is a salt providing a source of anions, e.g. fluoride ions.

8 Claims, No Drawings

PROCESS FOR EXTRUSION POLYMERIZATION OF ACRYLIC MONOMERS

This invention relates to an extrusion polymerisation process, in particular a process for the extrusion polymerisation of acrylic monomers, using catalysts. (The terms polymerisation and polymer herein include a reference to homo- and co-polymerisation and to homo- and co-polymers respectively, and the term monomer herein includes a reference to oligomers)

The addition polymerisation of vinylic monomer species, in particular the addition polymerisation of acrylic monomers, using a free-radical catalyst is well known.

However, the polymerisation of several known monomers (especially acrylics) tends to suffer from an excessive and not easily controllable reaction exotherm, so that well-controlled bulk polymerisation of such monomers has hitherto been difficult to achieve, and most such polymerisations have therefore disadvantageously had to be carried out in solution.

The bulk polymerisation of acrylics (in particular the free-radical polymerisation of methyl methacrylate) under adiabatic conditions typically results in polymers with a broad molecular weight distribution and a significant fraction of very high molecular weight material.

Extrusion bulk polymerisation of monomers using the direct injection of monomer and free radical catalyst is a known plastics production process.

However, in the case of the bulk polymerisation of acrylics (especially methyl methacrylate), the presence of the above mentioned high molecular weight material in the product reduces the realisable throughput rate of the extruder. This reduction usually occurs to an extent which renders the process impractical.

Similarly, the extruder itself must be excessively and impractically long, conversions are low, and the overall process is excessively, and again impractically, slow. The method is unsuitable.

It would be desirable to be able to produce moderately high molecular weight polymers with a narrower molecular weight distribution by catalysed bulk extrusion polymerisation in an extruder.

We have now found that it is possible to do so in an industrially feasible process, using certain catalysts.

Accordingly, the present invention provides a process for the bulk addition polymerisation of a monomer or monomer mixture to give a homopolymer or copolymer, which process is carried out at least in part in an extruder and is catalysed by a catalyst comprising:

(a) at least one initiator component of formula:

$$MX(Y_n)Z_p \quad \text{I}$$

wherein

X, Y and Z are bonded to M;
M is Si, Ge or Sn;
n is 0 or an integer and represents the number of Y groups bonded to M;
p is an integer such that (n+p)=3 and represents the number of Z groups bonded to M or the valency of group Z;
X is a group

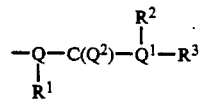

where
Q and $Q^1$ are independently N, P or As;
$Q^2$ is O, S, NR or PR where R is $C_{1-4}$ alkyl;
$R^1$ is H or optionally substituted hydrocarbyl; and
$R^2$ and $R^3$ are each independently optionally substituted hydrocarbyl, or $R^2$ and $R^3$ together are optionally substituted aliphatic hydrocarbadiyl;

all such $R^1$, $R^2$ and $R^3$ being inert in the conditions of the polymerisation process of the present invention;

each Y is independently an optionally substituted hydrocarbyl or hydrocarbyloxy group which is inert in the conditions of the polymerisation process of the present invention, or trialkylsilylalkyl; and when p=1, 2 or 3 and represents the number of Z groups attached to nucleus M, each Z is monovalent and is independently any group as defined for Y, or an organic polymer radical comprising further $MXY_n$ moieties; or when p=2 and represents the valency of group Z, Z is a divalent group having the formula:

(i) $-OSiR^5R^6OSiR^7R^8O-$ where $R^5$, $R^6$, $R^7$ and $R^8$ are each independently selected from H or optionally substituted hydrocarbyl, or (ii) -J- or -EJE- where E is oxygen and J is a polymer carrying further -MXY- or -EMXYE- moieties, or (iii) -ELE- where E is oxygen and L is an inorganic solid on whose surface the two —O— groups are located, said L carrying further -EMXYE- moieties; and (b) at least one co-catalyst which is a salt comprising an anion selected from azide, cyanide, cyanate, fluoride, bifluoride, nitrate and optionally substituted organic mono- and poly-phosphonates, -phosphinates, -sulphonates, -sulphinates, -carboxylates, -siloxides and -oxides; and a cation which in use of the catalyst is inert under the polymerisation process conditions yet renders the co-catalyst available in the polymerising medium.

If desired two or more initiators (a) and/or two or more co-catalysts (b) may be used in the process of the invention.

The organic anions from which the anion of component (b) may be selected include aliphatic and aromatic mono- and poly-phosphonates, -phosphinates, -sulphonates, -sulphinates, -carboxylates, -siloxides and -oxides. The organic moieties may be optionally substituted by electron withdrawing groups, such as cyano, halo including fluoro and chloro, and nitro in aromatic moieties.

The cation may render the catalyst available inter alia by rendering it soluble to an extent which renders the use of the catalyst practicable.

The initiator component (a) of the catalysts used in the process of the present invention may be used as such, or may be formulated into compositions with other materials, for example such conventional materials as catalyst supports.

In the process of the invention, it is desirable that the monomer(s) should be as free from impurity as possible. It is also preferable to minimise the water content of the monomer(s), the polymerisation initiator, the co-catalyst and any solvent (if used) and to conduct the process under anhydrous conditions so as to obtain relatively high molecular weight polymers by the present process.

The presence of significant amounts of water will tend to destroy the initiator, especially at elevated temperatures. Moreover, even concentrations significantly less than that of the initiator may prolong the induction period of the reaction undesirably. Accordingly, the monomer is preferably purified before use by distillation, followed by drying by passage through a drying column containing a desiccant, such as basic activated alumina Grade B and Zeolite 4A molecular sieves.

The initiator component (a) and the co-catalyst component (b) may both be soluble or dispersible in a monomer to be polymerised and/or in a solvent vehicle. Alternatively, the initiator (a) may be in an insoluble form, such as an initiator comprising an insoluble organic polymer or inorganic moiety, e.g. where in formula (I), Z is a divalent group -J-, -EJE- or -ELE- as hereinbefore defined; or the initiator may be comprised in an insoluble composition with an insoluble catalyst support.

Under the polymerisation process conditions the co-catalyst (b) must be available to effect polymerisation in the polymerisable medium and this often means it must be soluble in at least one liquid monomer species, and/or in a phase which contains at least one monomer species, to such an extent that it can catalyse the reaction adequately. Thus, if the co-catalyst is not soluble in a monomer, an inert solvent compatible with the monomer(s) may be used in sufficient quantities to dissolve the co-catalyst.

Examples of suitable inert solvents or vehicles include ether solvents such as diethyl ether, dimethoxyethane, diethoxyethane, diethylene glycol dimethyl ether or tetrahydrofuran; and hydrocarbon solvents such as benzene, toluene or xylene. The hydrocarbon series of solvents are preferred amongst such solvents.

In general such liquids should not contain labile hydrogen or halogen atoms or activated alkenyl groups.

No particular restrictions are placed on the order in which the polymerisation initiator (a) or a composition comprising it, co-catalyst (b) and monomer are added to the reaction system in the process of the present invention and polymerisation can proceed whatever sequence is used. For example, the catalyst components may be mixed and added to the monomer.

However, in terms of being able to control the bulk extrusion polymerisation of monomers easily, it is desirable to add the initiator (a) or composition comprising it and co-catalyst (b) separately to the reaction. Initiator (a) or co-catalyst (b) may be added neat, or in the form of a solution or dispersion in a monomer to be polymerised. As stated hereinbefore an organic solvent such as tetrahydrofuran may be employed to dissolve the co-catalyst.

Thus, one catalyst component may be mixed with the monomer or monomer mixture and the resulting mixture added to the other catalyst component. For example, the monomer(s) and initiator may be mixed together and the resulting mixture changed to a pre-polymerisation unit or directly to the extruder along with a co-catalyst feed which may be a solution of the co-catalyst in a suitable solvent vehicle.

Alternatively, the initiator, as a solution of dispersion in a monomer to be polymerised, may be charged along with further monomer(s) to a pre-mixing device and the resulting initiator/monomer mix fed to a pre-polymerisation unit or to the extruder along with a solution of the co-catalyst in a monomer to be polymerised or a solvent vehicle.

In another embodiment, the initiator and co-catalyst may be added to separate portions of a monomer(s) to be polymerised and the resulting initiator and co-catalyst solutions/dispersions fed to to a pre-polymerisation unit or to the extruder along with further monomer(s). Where dissolution of the co-catalyst is necessary, but is unsatisfactory in the monomer, an organic solvent which dissolves the co-catalyst may be used to form the co-catalyst solution feed.

In yet another embodiment, the monomer, initiator (a) and co-catalyst (b) are pre-mixed and the resulting polymerisable reagent mixture is then charged to a pre-polymerisation unit or directly to the extruder. The initiator (a) and co-catalyst (b) may be dissolved or dispersed in separate portions of a monomer(s) to be polymerised and the resulting initiator and co-catalyst solutions/dispersions fed to a mixing device along with further monomer(s) to form a polymerisable reagent mixture which is then charged as aforesaid. Where dissolution of the co-catalyst is necessary, but is unsatisfactory in the monomer, an organic solvent which dissolves the co-catalyst may be used to form the co-catalyst solution feed.

Where the initiator (a) or its composition is insoluble, the co-catalyst (b) may be added to the monomer or monomer mixture and the resulting monomer/co-catalyst mixture contacted with the initiator (a) or its composition.

The initiator component (a) is generally used in such an amount that the molar ratio of initiator to monomer(s) is 1:10 or less, and preferably in the range 1:50 to 1:1000, except where the initiator comprises an insoluble polymeric or inorganic solid (e.g. in formula (I) Z is -J-, -EJE- or -ELE- where E is oxygen, J is a polymer and L is an inorganic solid as hereinbefore defined), when the initiator may be used in an amount such that the molar ratio of initiator to monomer(s) is in the range 1:5 to 1:100.

The co-catalyst is normally used in such an amount that the molar ratio of initiator (a) to co-catalyst (b) is in the range of 3:1 to 300:1, more often 8:1 to 100:1.

The initial part of the polymerisation may be relatively slow and it may be useful, in order to limit the effects of such slowness, to carry out the first stage of the polymerisation reaction in a pre-polymerisation unit with turbulent flow of the liquid reacting mass under essentially isothermal conditions. The turbulent flow serves to ensure good mixing of the reacting mass, which also ensures good heat transfer to the walls of the unit to favour isothermal conditions.

The pre-polymerisation unit is conveniently a tube with internal baffles arranged in two opposed inter-projecting series such that the flow of the reaction mass pumped down the tube is serpentine.

The monomer, preferably purified and dried as described hereinbefore, may be fed continuously or semi-continuously (batch-wise), preferably continuously, into the pre-polymerisation unit.

The rate at which it is necessary to add the initiator to the reaction system to produce a product of a desired number average molecular weight may be determined by routine trial, and the initiator feeding means, e.g. a pump, may be set to supply initiator to the pre-polymerisation unit at that rate.

Similarly, the rate at which it may be necessary to add the co-catalyst to produce a satisfactory polymerisation conversion rate (i.e. rate of conversion of monomer(s) to polymer) in the pre-polymerisation unit may be determined by routine trial, and the co-catalyst feed means, e.g. a pump, may be set to supply co-catalyst to the pre-polymerisation unit at that rate.

The output of the pre-polymerisation unit may typically comprise 15 to 35% by weight polymer, more typically 20 to 30% by weight, as a polymer in monomer syrup.

Where a pre-polymerisation unit is used, the pre-polymerisation product syrup is then passed continuously or semi-continuously (batch-wise), preferably continuously, to a polymerisation extruder. Further co-catalyst may advantageously be introduced into the pre-polymerisation product syrup before it is fed to the extruder in order to optimise the overall polymerisation conversion rate. Again, the rate at which it may be necessary to add co-catalyst to optimise the polymerisation conversion rate in the extruder may be determined by routine trial and the co-catalyst feed means set to supply co-catalyst to the extruder input at that rate. The flow from the pre-polymerisation unit into the extruder is preferably adjusted so that the second rapid phase of the reaction starts as nearly as possible on entry into the extruder.

The pre-polymerisation unit is, of course, optional, and if it is omitted, monomer, initiator and co-catalyst may be fed directly to the extruder or preferably to a pre-mixing device to form a polymerisable reagent mixture which is then fed to the extruder. The reagent feeds are preferably continuous, but may be discontinuous.

The extruder will often be a twin-screw extruder in which the screws are positioned to clean the walls of the extruder barrel of the reacting mass continually during operation.

The polymerisation reaction is strongly exothermic and will tend to increase the temperature of the reacting mass in the extruder.

Typically, 50 to 80% of the monomer in the extruder feed-stock will be converted to polymer within 2 minutes.

It will be appreciated by the skilled man that in these conditions the reacting mass may increase rapidly in viscosity in the extruder, that the extruder must be capable of moving the mass under these conditions, and that the design of the extruder must be in order to achieve the latter.

The extruder screw speed may be adjusted by routine trial to give minimum hold-up.

The output of the extruder typically comprises 70 to 95 weight % polymer, more typically 75 to 90 weight % polymer.

The polymerisation process will generally be conducted at a range of temperatures as the reacting mass passes through the extruder. The temperature achieved in the extruder will depend on the heat transfer characteristics of the extruder, whether external cooling is applied to the extruder and the rate of polymer production. The latter is determined by the rate of introduction of feedstock material to the extruder. The process may be conducted, for example, at temperatures ranging from −40° C. to 250° C. with temperatures in the range of −20° to 180° C. being preferred.

The present process may be conducted under 1 to 50 atmospheres pressure. Normally any pressure conventionally placed on the reacting mass by the extruder operating at normal ambient atmospheric pressure is suitable.

It is also desirable, but not essential, to conduct the process of the present invention in atmospheres that have been dried in order to prevent the penetration of any water. Such atmospheres include dry air, or atmospheres of dried inert gases such as nitrogen or argon; dried inert gas atmospheres are preferable.

The reaction product may be post-treated to remove unreacted monomer and other volatiles. For example, the output from the extruder may be fed into a second devolatilisation extruder where the temperature of the polymer is raised under the application of reduced pressure.

Reaction of the monomer(s) and post-treatment to at least partially remove unreacted monomer and other volatiles is preferably carried out in a single extruder by having an appropriate pressure and temperature profile along the extruder path. Where reaction and post-treatment are effected in a single extruder, the extruder will normally comprise a first zone in which the polymerisable reagent mixture is reacted and a second zone which is operated at reduced pressure and optionally at elevated temperatures to provide for at least partial removal of the unreacted monomer and other volatiles contained in the product produced in the first zone. The temperature of the product produced in the first reaction zone may often be sufficient to allow for partial removal of unreacted monomer under the reduced pressure conditions operating in the second devolatilisation zone. By operation at reduced pressure we mean a pressure less than atmospheric pressure and preferably less than one tenth atmospheric pressure. Typically, the pressures operating in the second devolatilisation zone will be those associated with a vacuum. Of course, we do not exclude the possibility that a certain proportion of the monomer contained in the product passing into the second devolatilisation zone may polymerise.

The unreacted monomer (and other volatiles such as any low molecular weight oligomer) given off under the post-treatment conditions may be conventionally collected and recycled to the purification stage, the pre-polymerisation unit and/or the polymerisation extruder input. In excess of 99% pure polymer may be obtained in this way.

Finally, the polymer product produced in the extruder may be melted (if it is not already in melt form by virtue of the heat generated in the polymerisation reaction) and conventionally fed through a die to produce a product lace which can be cooled in water and chopped for moulding compound, or the melt may be fed into a continuous slit die to make sheet. In order to produce an extrudable polymer melt (i.e. a polymer melt which possesses sufficient fluidity for feeding through a die), the extruder may comprise a heated end zone, e.g. as a third zone, which is heated to temperatures in excess of 150° C. and generally in excess of 200° C. The heated end zone may also be operated under vacuum, e.g. a high vacuum, to provide for removal of unreacted monomer and other volatiles.

The process of the present invention may be suitable for the polymerisation of any vinylic monomer, in particular any acrylic monomer, in which the olefinic moiety is not substituted by any functional group possessing acidic hydrogen atoms.

Typical examples of acrylic monomers without such functional groups include:

methacrylic acid esters such as methyl methacrylate, ethyl methacrylate, propyl methacrylate, butyl methacrylate, 2-ethylhexyl methacrylate and lauryl methacrylate;

polyunsaturated methacrylic acid esters such as ethylene glycol dimethacrylate, triethyleneglycol dimethacrylate and allyl methacrylate;

acrylic acid esters such as methyl acrylate, ethyl acrylate, isopropyl acrylate, n-butyl acrylate, sec-butyl acrylate, tert-butyl acrylate and cyclohexyl acrylate;

unsaturated nitriles such as methacrylonitrile and acrylonitrile; and

N,N-dialkyl unsaturated amides such as N,N-dimethylacrylamide;

Other monomers which may be polymerised in the process of the present invention include methyl vinyl ketone and the maleimides having a hydrocarbyl group bonded to the nitrogen atom.

Preferred monomers may be selected from the acrylic monomers such as methyl methacrylate, lauryl methacrylate, butyl methacrylate, 2-ethylhexyl methacrylate, methyl acrylate, butyl acrylate. The alkyl esters of methacrylic acid form a particularly preferred group of monomers and methyl methacrylate is an especially preferred monomer.

The monomers may be used singly or in combination.

The product polymer of the process of the present invention preferably has a number average molecular weight in the range of 25,000 to 400,000, e.g. 50,000 to 200,000.

In the initiator component (a) of the catalyst:

M is preferably Si.

The term optionally substituted herein in relation to X, Y and Z groups includes substitution by pendent mono- or di-valent atoms or groups, and, in relation to X only, includes substitution by hetero-atoms.

It will be appreciated that although bonds between M and at least one of X, Y or Z break in the catalytic process of the present invention, the groups themselves should be inert in the process conditions.

For this reason such groups, even when described as optionally substituted, are often unsubstituted by pendent monovalent substituents.

Unsubstituted hydrocarbyl and hydrocarbadiyl groups tend to be inert in the conditions of the process of the present invention.

Hydrocarbyl and hydrocarbadiyl groups which are substituted and also inert in the conditions of the process of the present invention may include such groups substituted by electron donor groups, e.g. amino substituted by aliphatic substituents such as alkyl, cycloalkyl and alkoxy. The hydrocarbyl and hydrocarbadiyl groups, even when described as optionally substituted, are often unsubstituted by pendent monovalent substituents.

Within X as hereinbefore defined each of Q and $Q^1$ are preferably N and $Q^2$ is preferably O, so that X is a ureido functional group, i.e. a group of formula:

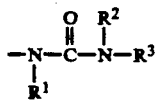   II

Suitable optionally substituted hydrocarbyl groups for $R^1$, $R^2$ and $R^3$ may be selected from optionally substituted alkyl and cycloalkyl groups (including polycycloalkyl groups).

Suitable optionally substituted hydrocarbyl groups for $R^1$, $R^2$ and $R^3$ may also be selected from optionally substituted aryl and aralkyl groups.

Suitable alkyl groups for $R^1$, $R^2$ and $R^3$ alkyl and suitable alkyl groups in $R^1$, $R^2$ and $R^3$ substituted alkyl may be selected from the $C_{1-10}$ alkyl groups, in particular the $C_{1-6}$ straight chain alkyl groups. Preferred alkyl groups for $R^1$, $R^2$ and $R^3$ optionally substituted alkyl are independently selected from methyl, ethyl, n-propyl, n-butyl, n-pentyl and n-hexyl, especially methyl. Suitable substituted alkyl groups may be selected from the oxa-substituted alkyl groups, in particular $C_{1-6}$ straight-chain alkoxy groups, or the sila-substituted alkyl groups, in particular trialkylsilyl groups where each alkyl bonded to the silicon atom is independently a $C_{1-6}$ straight-chain alkyl group.

Suitable cycloalkyl groups for $R^1$, $R^2$ and $R^3$ optionally substituted cycloalkyl may be selected from the $C_{5-8}$ cycloalkyl groups, for example cyclohexyl, and the polycycloalkyl groups.

Suitable optionally substituted aryl groups for $R^1$, $R^2$ and $R^3$ may be selected from phenyl optionally substituted by substituents which are inert in the desired polymerisation conditions such as alkyl and aryl.

Suitable optionally substituted aralkyl groups for $R^1$, $R^2$ and $R^3$ may include the above suitable alkyl groups substituted by the above suitable aryl groups, and thus include benzyl optionally substituted on the phenyl ring.

One of $R^2$ or $R^3$ may be bulkily substituted aralkyl and/or one of $R^1$, $R^2$ or $R^3$ may be bulky cycloalkyl (e.g. polycycloalkyl) or optionally substituted branched alkyl.

In a another type of initiator which may be used in the process of the invention, $R^2$ and $R^3$ together are an optionally substituted aliphatic hydrocarbadiyl group. The aliphatic hydrocarbadiyl group $(R^2+R^3)$ may be substituted by hetero-atoms other than nitrogen or by pendent monovalent substituents.

Suitable $(R^2+R^3)$ optionally substituted aliphatic hydrocarbadiyl exclude 1,2-diyl, but include optionally substituted alkanediyl, cycloalkanediyl (including polycycloalkanediyl), and diradical combinations of such diradicals.

Suitable $(R^2+R^3)$ optionally substituted alkanediyl include $\alpha,\omega$-$C_{3-6}$ alkanediyl optionally substituted by at least one hetero atom or group.

Suitable substituent hetero atoms and groups include O, S or $NR^9$ where $R^9$ is any group as defined for $R^1$ hereinbefore, or an $M(Y_n)Z_p$ group as hereinbefore defined.

Examples of $QR^2R^3$ groups thus include 4 to 7-member heterocyclyl groups, such as pyrrolidino, piperidino and morpholino.

A particularly preferred group X has the formula:

   III where
$R^{10}$ is $C_{1-10}$ alkyl, in particular $C_{1-6}$ straight-chain alkyl; and
$R^{11}$ and $R^{12}$ are independently $C_{1-10}$ alkyl, in particular $C_{1-6}$ straight-chain alkyl, or sila-substituted alkyl, in particular trialkylsilyl in which each alkyl bonded to the silicon is independently $C_{1-6}$ straight-chain alkyl.

Suitable optionally substituted hydrocarbyl and hydrocarbyloxy groups for Y and Z include those recited for $R^1$, $R^2$ and $R^3$ hereinbefore.

Suitable Y and Z hydrocarbyl groups may be selected from the $C_{1-20}$ alkyl groups, such as the $C_{1-8}$ alkyl groups. Preferred $C_{1-8}$ alkyl groups are the straight-chain $C_{1-4}$ alkyl groups, in particular methyl and ethyl and especially methyl. Suitable alkyl groups may also be selected from the branched $C_{4-8}$ alkyl groups.

Suitable Y and Z hydrocarbyl groups may also be selected from the $C_{4-7}$ cycloalkyl groups, e.g. cyclohexyl, and polycycloalkyl groups, e.g. adamantyl.

Further suitable Y and Z hydrocarbyl groups may be selected from the aryl and aralkyl groups such as phenyl, 1-naphthyl and benzyl.

Suitable Y and Z hydrocarbyloxy groups may be selected from the $C_{1-4}$ alkoxy groups such as methoxy and ethoxy.

Suitable Y and Z hydrocarbyloxy groups may also be selected from the $C_{4-7}$ cycloalkoxy groups such as cyclohexyloxy.

Further suitable hydrocarbyloxy groups for Y and Z may be selected from the aryloxy or aralkoxy groups such as phenoxy and benzyloxy.

The above mentioned hydrocarbyl and hydrocarbyloxy groups for Y and Z may be substituted by pendent mono or divalent atoms or groups which are inert in the polymerisation process of the present invention.

When Z is a divalent group having the formula —O—SiR$^5$R$^6$OSiR$^7$R$^8$O—, R$^5$, R$^6$, R$^7$ and R$^8$ are conveniently the same and may be, for example, optionally substituted benzyl, $C_{1-6}$ alkyl or phenyl.

The term polymer herein in relation to the initiator components of the present catalysts and their compositions includes a reference to oligomers. The term in particular includes polymers of vinylic monomers.

Where Z is a monovalent organic polymer radical, or Z is a divalent group —J— or —OJO— where J is a polymer, the polymer is conveniently a particulate one insoluble in any desired polymerisation system (for example a highly cross-linked polymer) with the MXY moieties on its surface.

The polymer may be a solid granulate of relatively high surface area, for example in the range 200 to 600 m$^2$/g, and may carry a concentration of MXY moieties of 1 every 3 to 30 square Angstroms.

M in each MXY moiety may be linked to the polymer via a carbon atom, e.g. a carbon atom of a pendent alkyl chain of the type described for Y and Z straight-chain alkyl above.

The MXY groups on the polymer will often all be identical.

Depending on the polymerisation medium in which the present catalyst is used, in particular where the initiator is to be insoluble, highly cross-linked alkylene, arylene, acrylic or styrene homo- or co-polymers may be appropriate for a polymer containing group Z.

Further suitable divalent Z groups include those having the formula —OLO— where L is an inorganic solid with a plurality of surface hydroxyl functions, such as silica or a metal hydroxide or hydrated oxide, e.g. alumina.

L may be inter alia a flat body of low specific surface area or a particulate with a relatively high specific surface area, for example in the range 200 to 600 m$^2$/g.

The —OMXYO— moieties may be present on the surface of the inorganic solid at a concentration of 1 every 3 to 30 square Angstroms.

Such concentrations may be achieved by involving at least 20%, preferably at least 60%, of the available surface hydroxyl functions in —OLO— bonding to MXY moieties.

In preferred embodiments each Z is a monovalent group and is independently any group as defined for Y, or an organic polymer radical comprising further MXY$_n$ moieties. Preferably each Z is any group as defined for Y.

Accordingly, in a preferred embodiment of the present invention the initiator used in the polymerisation process is of formula:

$$MX(Y_q)Z^1{}_r \qquad \text{IV}$$

wherein
M is Si, Ge or Sn, preferably Si;
q and r are each an integer such that (q+r)=3;
X is as defined in Formula I;
each Y is as defined in Formula I; and
each $Z^1$ is a monovalent Z group as defined in Formula I.

Suitable and preferred X, Y and $Z^1$ are as so described for relevant X, Y and Z hereinbefore. Preferably, each of Y and $Z^1$ are independently hydrocarbyl, in particular $C_{1-8}$ alkyl. More preferably, each of Y and $Z^1$ are independently $C_{1-4}$ straight-chain alkyl and in especially preferred embodiments each of Y and $Z^1$ are methyl. X is preferably a group of Formula III.

A favoured anion in the co-catalyst component (b) is fluoride.

Favoured cations therein, which render the catalyst available in the polymerisation medium, are often substituted -onium ions. These include quaternary ammonium, phosphonium, and tris(dialkylamino)-sulphonium ions, often substituted by $C_{3-6}$ alkyl groups such as butyl. Tetraalkylammonium cations are especially preferred.

Alkali and alkaline earth metal cations are less preferred, but may possibly be used.

Initiator components of Formula (IV) will tend to be soluble or dispersible in desired polymerisation systems. All the initiator components may be used as such, or they may be formulated into compositions with other materials. For example, they may be formulated into insoluble or non-dispersible compositions, e.g. with such conventional materials as catalyst supports. Such compositions may be of use in the process of the present invention.

Where such a composition is insoluble it may be seen as an alternative to insoluble forms of the initiator component itself, i.e. when Z is a monovalent polymer radical or a divalent group —J—, —OJO— or —OLO— as described hereinbefore. The initiator component in such a composition may be adhered to or embedded in the surface of a support rather than chemically bonded to it.

The support may comprise a polymer, e.g. a highly cross-linked acrylic or styrene homo- or co-polymer, e.g. a particulate one insoluble in any desired polymerisation system, or a similarly insoluble (particulate) inorganic solid.

Any co-catalyst component (b) which in use of the catalyst is available in the polymerisation as described hereinbefore may be suitable for use with initiator compositions in the process of the present invention.

The co-catalyst components (b) are known materials.

The initiator components (a) may be prepared analogously to, or are routinely derivable, from known materials. For example many of the groups X, Y and Z may be introduced to form the compounds of Formula (I) by conventional nucleophilic displacement at the M nucleus with suitable corresponding moieties.

Where the M nucleus is linked by two —O— groups to a solid or polymer as hereinbefore defined, the links may be formed by conventional silylation of adjacent hydroxyl groups.

The preparation of initiator components (a) is more particularly described in the present applicants published European patent application EP-0405785 A2 the disclosure in which is incorporated herein by way of reference.

The present invention is now illustrated but not limited by the following Examples:

EXAMPLES

In the Examples the extruder used was a twin screw extruder of 30 mm diameter and comprising three distinct operational zones. The extruder screws were rotated at between 290 and 450 rpm. The polymerisation of the reactive monomer mixture occurred predominantly in the first zone of the extruder and this reaction was monitored using a thermocouple to record the exotherm. The second zone was operated at reduced pressures in order to provide for partial removal of unreacted monomer contained in the product produced in the first zone. Oil at ambient temperature was circulated around the outside wall of the extruder in the region of the first and second zones in order to provide external cooling to those zones. The third zone was operated at 240° C. under high vacuum and converted the product mixture exiting the second zone into a flowable extrudable melt to allow for the extrusion thereof through a heated die arranged at the end of the extruder.

In operation, the polymerisable reagent mixture was fed to the extruder and entered the first zone where polymerisation of the reactive monomers occurred. The polymer product produced in the first zone passed into the second zone where monomer removal occurred and then into the third zone where the polymer was melted. Finally the polymer melt was extruded through a die, cooled and then chopped to give a granular polymer as the final product.

Preparation of initiator 1,3-bis(trimethylsilyl)-1,3-dimethyl urea 1,3-dimethylurea (44.0 g, 0.5 mole) and triethylamine (250 mls) were charged to a stirred reaction vessel purged with dry nitrogen. The mixture was stirred for 5 minutes and then chlorotrimethylsilane (167.5 mls, 1.32 moles) was added resulting in the formation of a white precipitate. The resulting reaction mixture was stirred for a further 24 hours at ambient temperature after which it was filtered under a nitrogen atmosphere. The filter cake was washed with dry toluene and the combined organics filtrate was distilled at atmospheric pressure under a nitrogen atmosphere. The residual organics were subjected to fractional distillation at a pressure of 8 mmHg. The fraction distilling at 86° to 88° C. was the required initiator.

EXAMPLE 1

This Example illustrates the bulk extrusion polymerisation of methyl methacrylate and butyl methacrylate using 1,3-bis(trimethylsilyl)-1,3-dimethyl urea as the initiator and tetrabutylammonium fluoride trihydrate as the co-catalyst.

The co-catalyst (pre-dried under high vacuum over $P_2O_5$) was dissolved in dry methyl methacrylate to give a solution containing $3.61 \times 10^{-3}$ moles of the co-catalyst per liter of methyl methacrylate.

Dry methyl methacrylate at 7.8 l/hour, dry butyl methacrylate at 0.6 l/hour, dry initiator at 77.3 ml/hour and the co-catalyst solution at 1.6 l/hour were fed continuously to a mixing device and the resulting reagent mixture was continuously fed to the extruder. The premixing of the reagents was effected in-line using a T-piece mixing device and pulse free flows to provide high turbulence with minimum in-line residence times. The exotherm accompanying the reaction of the monomers in the first zone of the extruder raised the temperature of the polymerising mixture to 90° C. The process was continued for 30 minutes and the final product was weighed and analysed. 3.6 Kg of the polymer was produced. The polymer had a number average molecular weight ($M_n$) of 43,200, a molecular weight distribution of 1.8 and contained 0.7 weight % of residual monomer.

EXAMPLE 2

This Example illustrates the bulk extrusion polymerisation of methyl methacrylate and butyl methacrylate using 1,3-bis(trimethylsilyl)-1,3-dimethyl urea as the initiator and tetrabutylammonium fluoride trihydrate as the co-catalyst.

The co-catalyst (pre-dried under high vacuum over $P_2O_5$) was dissolved in dry methyl methacrylate to give a solution containing $3.61 \times 10^{-3}$ moles of the co-catalyst per liter of methyl methacrylate.

Dry methyl methacrylate at 8.3 l/hour, dry butyl methacrylate at 0.6 l/hour, dry initiator at 51.6 ml/hour and the co-catalyst solution at 1.1 l/hour were fed continuously to a mixing device and the resulting reagent mixture was continuously fed to the extruder. The premixing of the reagents was effected using the technique described in Example 1. The exotherm accompanying the reaction of the monomers in the first zone of the extruder raised the temperature of the polymerising mixture to 90° C. The process was continued for 30 minutes and the final product was weighed and analysed. 3.6 Kg of the polymer was produced. The polymer had a number average molecular weight ($M_n$) of 57,400, a molecular weight distribution of 2.1 and contained 2.27 weight % of residual monomer.

We claim:

1. A process for the bulk addition polymerisation of one or more acrylic monomers to give a homopolymer or copolymer, which process comprises the step of contacting the one or more monomers, or a partly polymerised product derived therefrom, in the confines of an extruder with a catalyst comprising:

(a) at least one initiator component of formula:

$$MX(Y_n)Z_p \qquad \qquad I$$

wherein
X, Y and Z are bonded to M;
M is Si, Ge or Sn;

n is 0 or an integer and represents the number of Y groups bonded to M;

p is an integer such that (n+p)=3 and represents the number of Z groups bonded to M or the valency of group Z;

X is a group

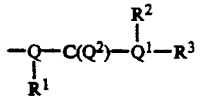

where

Q and $Q^1$ are independently N, P or As;

$Q^2$ is O, S, NR or PR where R is $C_{1-4}$ alkyl;

$R^1$ is H or optionally substituted hydrocarbyl; and $R^2$ and $R^3$ are independently optionally substituted hydrocarbyl, or $R^2$ and $R^3$ together are optionally substituted aliphatic hydrocarbadiyl;

all such $R^1$, $R^2$ and $R^3$ being inert in the conditions of the polymerisation process of the present invention;

each Y is independently an optionally substituted hydrocarbyl or hydrocarbyloxy group which is inert in the conditions of the polymerisation process of the present invention, or trialkylsilylalkyl; and when p=1, 2 or 3 and represents the number of Z groups attached to nucleus M, each Z is monovalent and is independently any group as defined for Y, or an organic polymer radical comprising further $MXY_n$ moieties; or when p=2 and represents the valency of group Z, Z is a divalent group having the formula:

(i) $-OSiR^5R^6OSiR^7R^8O-$ where $R^5$, $R^6$, $R^7$ and $R^8$ are independently H or optionally substituted hydrocarbyl, or (ii) -J- or -EJE- where E is oxygen and J is a polymer carrying further -MXY- or -EMXYE- moieties, or (iii) -ELE- where E is oxygen and L is an inorganic solid on whose surface the two —O— groups are located, said L carrying further -EMXYE- moieties; and (b) at least one co-catalyst which is a salt comprising an anion selected from azide, cyanide, cyanate, fluoride, bifluoride, nitrate and optionally substituted organic mono- and poly-phosphonates, -phosphinates, -sulphonates, -sulphinates, -carboxylates, -siloxides and -oxides; and a cation which in use of the catalyst is inert under the polymerisation process conditions yet renders the co-catalyst available in the polymerising medium.

2. A process as claimed in claim 1 wherein the initiator (a) and co-catalyst (b) are added separately to the reaction.

3. A process as claimed in claim 1 or claim 2 wherein the extruder comprises a first zone in which the polymerisable material reacts and a second zone which is operated at reduced pressure to provide for at least partial removal of unreacted monomer and other volatiles contained in the product produced in the first zone.

4. A process as claimed in claim 1 wherein the initiator component (a) is of formula:

$$MX(Y_q)Z^1_r \qquad \text{IV}$$

wherein

M is Si;

q and r are each an integer such that (q+r)=3;

X is as defined in claim 1;

each Y is as defined in claim 1; and each $Z^1$ is a monovalent Z group as defined in claim 1.

5. A process as claimed in claim 4 wherein Y and $Z^1$ are independently $C_{1-8}$ alkyl.

6. A process as claimed in claim 4 or claim 5 wherein X is a group of formula:

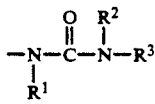

where $R^1$, $R^2$ and $R^3$ are as defined in claim 1.

7. A process as claimed in claim 6 wherein $R^1$, $R^2$ and $R^3$ are independently optionally substituted alkyl or optionally substituted cycloalkyl.

8. A process as claimed in claim 1 wherein the anion in co-catalyst component (b) is fluoride.

* * * * *